US012410079B2

(12) United States Patent
Cote et al.

(10) Patent No.: US 12,410,079 B2
(45) Date of Patent: Sep. 9, 2025

(54) MEMBRANE ASSEMBLY FOR SUPPORTING A BIOFILM

(71) Applicant: BL TECHNOLOGIES, INC., Minnetonka, MN (US)

(72) Inventors: Pierre Lucien Cote, Ancaster (CA); Steven Kristian Pedersen, Nottawa (CA)

(73) Assignee: BL TECHNOLOGIES, INC., Minnetonka, MN (US)

( * ) Notice: Subject to any disclaimer, the term of this patent is extended or adjusted under 35 U.S.C. 154(b) by 0 days.

(21) Appl. No.: 18/338,182

(22) Filed: Jun. 20, 2023

(65) Prior Publication Data

US 2023/0331605 A1 Oct. 19, 2023

Related U.S. Application Data

(63) Continuation of application No. 16/998,704, filed on Aug. 20, 2020, now Pat. No. 11,724,947, which is a
(Continued)

(51) Int. Cl.
*C02F 3/12* (2023.01)
*B01D 63/02* (2006.01)
(Continued)

(52) U.S. Cl.
CPC .......... *C02F 3/1273* (2013.01); *B01D 63/027* (2013.01); *B01D 63/04* (2013.01);
(Continued)

(58) Field of Classification Search
CPC .......... C02F 3/208; C02F 3/20; C02F 3/1273; B01D 2313/26
See application file for complete search history.

(56) References Cited

U.S. PATENT DOCUMENTS 2,458,163 A 1/1949 Hays
3,226,317 A 12/1965 Albertson
(Continued)

FOREIGN PATENT DOCUMENTS

CA 2005959 A1 6/1990
CA 2100002 A1 2/1994
(Continued)

OTHER PUBLICATIONS

Semmens et al., "Studies of a Membrane Aerated Bioreactor for Wastewater Treatment," Membrance Technology, Jul. 1999, vol. 111, pp. 9-13.
(Continued)

*Primary Examiner* — Ryan B Huang

(57) ABSTRACT

A cord for supporting a biofilm has a plurality of yarns. At least one of the yarns comprises a plurality of hollow fiber gas transfer membranes. At least one of the yarns extends along the length of the cord generally in the shape of a spiral. Optionally, one or more of the yarns may comprise one or more reinforcing filaments. In some examples, a reinforcing yarn is wrapped around a core. A module may be made by potting a plurality of the cords in at least one header. A reactor may be made and operated by placing the module in a tank fed with water to be treated and supplying a gas to the module. In use, a biofilm covers the cords to form a membrane biofilm assembly.

5 Claims, 8 Drawing Sheets

Related U.S. Application Data continuation of application No. 14/769,461, filed as application No. PCT/US2013/027435 on Feb. 22, 2013, now Pat. No. 10,781,119.

(51) Int. Cl.
  *B01D 63/04* (2006.01)
  *B01D 69/08* (2006.01)
  *C02F 3/10* (2023.01)
  *C02F 3/20* (2023.01)

(52) U.S. Cl.
  CPC ............ *B01D 69/081* (2013.01); *C02F 3/102* (2013.01); *C02F 3/103* (2013.01); *C02F 3/208* (2013.01); *B01D 2325/40* (2013.01); *C02F 2303/20* (2013.01); *Y02W 10/10* (2015.05)

(56) References Cited

U.S. PATENT DOCUMENTS

| | | |
|---|---|---|
| 4,066,553 A | 1/1978 | Bardonnet |
| 4,067,801 A | 1/1978 | Ishida |
| 4,126,544 A | 11/1978 | Baensch |
| 4,181,604 A | 1/1980 | Ryozo |
| 4,270,702 A | 6/1981 | Nicholson |
| 4,328,102 A | 5/1982 | Bellhouse |
| 4,341,005 A | 7/1982 | Oscarsson |
| 4,416,993 A | 11/1983 | McKeown |
| 4,428,403 A | 1/1984 | Lee |
| 4,563,282 A | 1/1986 | Wittmann |
| 4,664,681 A | 5/1987 | Anazawa |
| 4,746,435 A | 5/1988 | Onishi |
| 4,883,594 A * | 11/1989 | Sekoulov ................ C02F 3/208 210/603 |
| 4,960,546 A | 10/1990 | Tharp |
| 5,015,421 A | 5/1991 | Messner |
| 5,034,164 A | 7/1991 | Semmens |
| 5,034,165 A | 7/1991 | Willinger |
| 5,043,140 A | 8/1991 | Combs |
| 5,116,506 A | 5/1992 | Williamson |
| 5,126,050 A | 6/1992 | Irvine |
| 5,149,649 A | 9/1992 | Miyamori |
| 5,213,685 A | 5/1993 | Padovan |
| 5,238,562 A | 8/1993 | Rogut |
| 5,282,964 A | 2/1994 | Young |
| 5,374,138 A | 12/1994 | Byles |
| 5,395,468 A | 3/1995 | Juliar |
| 5,439,736 A | 8/1995 | Nomura |
| 5,482,859 A | 1/1996 | Biller |
| 5,486,475 A | 1/1996 | Kramer |
| 5,518,620 A | 5/1996 | Eguchi |
| 5,520,812 A | 5/1996 | Ryhiner |
| 5,523,003 A | 6/1996 | Sell |
| 5,543,039 A | 8/1996 | Odegaard |
| 5,591,342 A | 1/1997 | Delporte |
| 5,602,719 A | 2/1997 | Kinion |
| 5,647,986 A | 7/1997 | Nawathe |
| 5,716,689 A | 2/1998 | Rogut |
| 5,725,949 A * | 3/1998 | Pasquali ............. B01D 63/033 57/247 |
| 5,762,415 A | 6/1998 | Tolley |
| 5,798,043 A | 8/1998 | Khudenko |
| 5,910,249 A | 6/1999 | Kopp |
| 5,942,117 A | 8/1999 | Hunter |
| 5,945,002 A | 8/1999 | Leukes |
| 6,001,585 A | 12/1999 | Gramer |
| 6,013,511 A | 1/2000 | Diels |
| 6,183,643 B1 | 2/2001 | Goodley |
| 6,209,855 B1 | 4/2001 | Glassford |
| 6,214,226 B1 | 4/2001 | Kobayashi |
| 6,241,867 B1 | 6/2001 | Mir |
| 6,299,774 B1 | 10/2001 | Ainsworth |
| 6,309,550 B1 | 10/2001 | Iversen |
| 6,354,444 B1 | 3/2002 | Mahendran |
| 6,361,695 B1 | 3/2002 | Husain |
| 6,367,783 B1 | 4/2002 | Raftis |
| 6,387,262 B1 | 5/2002 | Rittmann |
| 6,387,264 B1 | 5/2002 | Baur |
| 6,485,645 B1 | 11/2002 | Husain |
| 6,531,062 B1 | 3/2003 | Whitehill |
| 6,543,753 B1 | 4/2003 | Tharp |
| 6,555,002 B2 | 4/2003 | Garcia |
| 6,558,549 B2 | 5/2003 | Cote |
| 6,641,733 B2 | 11/2003 | Zha |
| 6,645,374 B2 | 11/2003 | Cote |
| 6,685,832 B2 | 2/2004 | Mahendran |
| 6,692,642 B2 | 2/2004 | Josse |
| 6,706,185 B2 | 3/2004 | Goel |
| 6,743,362 B1 | 6/2004 | Porteous |
| 6,863,815 B1 | 3/2005 | Smith |
| 6,878,279 B2 | 4/2005 | Davis |
| 6,921,485 B2 | 7/2005 | Kilian |
| 6,982,036 B2 | 1/2006 | Johnson |
| 7,169,295 B2 | 1/2007 | Husain |
| 7,186,340 B1 | 3/2007 | Rittmann |
| 7,252,765 B2 | 8/2007 | Barnard |
| 7,294,259 B2 | 11/2007 | Cote |
| 7,300,571 B2 | 11/2007 | Cote |
| 7,303,676 B2 | 12/2007 | Husain |
| 7,318,894 B2 | 1/2008 | Juby |
| 7,622,047 B2 | 11/2009 | Koch |
| 7,699,985 B2 | 4/2010 | Cote |
| 7,713,417 B2 | 5/2010 | Sutton |
| 7,722,768 B2 | 5/2010 | Abma |
| 8,012,352 B1 | 9/2011 | Giraldo |
| 8,545,700 B1 | 10/2013 | Stroot |
| 8,894,857 B2 | 11/2014 | Liu |
| 2001/0027951 A1 | 10/2001 | Gungerich |
| 2002/0158009 A1 | 10/2002 | Khudenko |
| 2002/0171172 A1 | 11/2002 | Lowell |
| 2003/0092020 A1 | 5/2003 | Carson |
| 2003/0104192 A1 | 6/2003 | Hester |
| 2003/0173706 A1 | 9/2003 | Rabie |
| 2003/0201225 A1 | 10/2003 | Josse |
| 2003/0203183 A1 | 10/2003 | Hester |
| 2004/0060442 A1 | 4/2004 | Nakahara |
| 2004/0065611 A1 | 4/2004 | Jones |
| 2004/0079692 A1 | 4/2004 | Cote |
| 2004/0115782 A1 | 6/2004 | Paterek |
| 2004/0149233 A1 | 8/2004 | Cummins |
| 2004/0211723 A1 | 10/2004 | Husain |
| 2004/0224396 A1 | 11/2004 | Maston |
| 2004/0229343 A1 * | 11/2004 | Husain .................. C02F 3/1273 210/615 |
| 2004/0238432 A1 | 12/2004 | Mahendran |
| 2004/0251010 A1 | 12/2004 | Doh |
| 2005/0051481 A1 | 3/2005 | Husain |
| 2005/0064577 A1 | 3/2005 | Berzin |
| 2005/0194311 A1 | 9/2005 | Rozich |
| 2005/0260739 A1 | 11/2005 | Rosen |
| 2005/0269263 A1 | 12/2005 | Rittmann |
| 2006/0096918 A1 | 5/2006 | Semmens |
| 2006/0124541 A1 | 6/2006 | Logan |
| 2006/0163155 A1 | 7/2006 | Chauzy |
| 2006/0249449 A1 | 11/2006 | Nakhla |
| 2007/0000836 A1 | 1/2007 | Elefritz |
| 2007/0012619 A1 | 1/2007 | Thielert |
| 2007/0163958 A1 | 7/2007 | Newcombe |
| 2007/0235385 A1 | 10/2007 | Barnes |
| 2008/0223783 A1 | 9/2008 | Sutton |
| 2008/0305539 A1 | 12/2008 | Hickey |
| 2009/0095675 A1 | 4/2009 | Runneboom |
| 2009/0152762 A1 | 6/2009 | Rave |
| 2009/0194477 A1 | 8/2009 | Hashimoto |
| 2009/0206026 A1 | 8/2009 | Yoon |
| 2010/0012582 A1 | 1/2010 | Frechen |
| 2010/0170845 A1 | 7/2010 | Baur |
| 2010/0224540 A1 | 9/2010 | Rolchigo |
| 2010/0264079 A1 | 10/2010 | Begin |
| 2011/0031176 A1 | 2/2011 | Knappe |
| 2011/0198283 A1 | 8/2011 | Zha |
| 2011/0203992 A1 | 8/2011 | Liu |
| 2011/0315629 A1 | 12/2011 | Drogui |
| 2012/0000849 A1 | 1/2012 | Fassbender |

(56) References Cited

U.S. PATENT DOCUMENTS

| | | | |
|---|---|---|---|
| 2012/0097604 | A1 | 4/2012 | Cote |
| 2012/0193287 | A1 | 8/2012 | Brouwer |
| 2013/0027435 | A1 | 1/2013 | Houjou |
| 2013/0134089 | A1 | 5/2013 | Cote |
| 2013/0213883 | A1 | 8/2013 | Josse |
| 2014/0034573 | A1 | 2/2014 | Wenjun |
| 2014/0311970 | A1 | 10/2014 | Theodoulou |

FOREIGN PATENT DOCUMENTS

| | | | |
|---|---|---|---|
| CA | 2102156 | A1 | 7/1994 |
| CA | 2182915 | A1 | 2/1997 |
| CA | 2356316 | A1 | 8/2000 |
| CA | 2300719 | A1 | 9/2001 |
| CA | 2458566 | A1 | 8/2004 |
| CN | 1191768 | A | 9/1998 |
| CN | 1569682 | A | 1/2005 |
| CN | 1747903 | A | 3/2006 |
| CN | 1802322 | A | 7/2006 |
| CN | 1830531 | A | 9/2006 |
| CN | 101234817 | A | 8/2008 |
| CN | 201098607 | Y | 8/2008 |
| CN | 101316646 | A | 12/2008 |
| CN | 101370569 | A | 2/2009 |
| CN | 101538101 | A | 9/2009 |
| CN | 101790411 | A | 7/2010 |
| CN | 101966427 | A | 2/2011 |
| CN | 101980969 | A | 2/2011 |
| CN | 201850172 | U | 6/2011 |
| CN | 102333581 | A | 1/2012 |
| CN | 202139109 | U | 2/2012 |
| CN | 102665878 | A | 9/2012 |
| CN | 102753487 | A | 10/2012 |
| CN | 202542950 | U | 11/2012 |
| CN | 102826652 | A | 12/2012 |
| CN | 202908827 | U | 5/2013 |
| CN | 203060938 | U | 7/2013 |
| DE | 3544382 | A1 | 6/1987 |
| DE | 3730797 | A1 | 3/1989 |
| DE | 4326603 | A1 | 2/1995 |
| DE | 4440464 | C1 | 6/1996 |
| DE | 10318736 | A1 | 11/2004 |
| DE | 102006034984 | A1 | 1/2008 |
| EP | 0488520 | A1 | 6/1992 |
| EP | 0732141 | A1 | 9/1996 |
| EP | 1496607 | A1 | 1/2005 |
| EP | 0970922 | B1 | 9/2007 |
| JP | S53135167 | A | 11/1978 |
| JP | S5421057 | A | 2/1979 |
| JP | S5845796 | A | 3/1983 |
| JP | S61120694 | A | 6/1986 |
| JP | H01119397 | A | 5/1989 |
| JP | H02194899 | A | 8/1990 |
| JP | H02207899 | A | 8/1990 |
| JP | H02251299 | A | 10/1990 |
| JP | H03131397 | A | 6/1991 |
| JP | H03249999 | A | 11/1991 |
| JP | H04171096 | A | 6/1992 |
| JP | H0576899 | | 3/1993 |
| JP | H07148500 | A | 6/1995 |
| JP | H08155498 | A | 6/1996 |
| JP | H08246283 | A | 9/1996 |
| JP | H0985298 | A | 3/1997 |
| JP | H09136100 | A | 5/1997 |
| JP | H10128397 | A | 5/1998 |
| JP | H10337448 | A | 12/1998 |
| JP | H11309480 | A | 11/1999 |
| JP | 2000061491 | A | 2/2000 |
| JP | 2000070908 | A | 3/2000 |
| JP | 2000086214 | A | 3/2000 |
| JP | 2002224699 | A | 8/2002 |
| JP | 2003053378 | A | 2/2003 |
| JP | 2003117590 | A | 4/2003 |
| JP | 2003200198 | A | 7/2003 |
| JP | 2004290921 | A | 10/2004 |
| JP | 2004351324 | A | 12/2004 |
| JP | 2005342635 | A | 12/2005 |
| JP | 2007050387 | A | 3/2007 |
| JP | 2008114215 | A | 5/2008 |
| JP | 2008253994 | A | 10/2008 |
| JP | 2009285648 | A | 12/2009 |
| KR | 20010035160 | A | 5/2001 |
| KR | 20050102115 | A | 10/2005 |
| KR | 101050375 | B1 | 7/2011 |
| KR | 101179687 | B1 | 9/2012 |
| KR | 20120140329 | A | 12/2012 |
| KR | 20130079834 | A | 7/2013 |
| KR | 101297685 | B1 | 8/2013 |
| KR | 20130130360 | A | 12/2013 |
| SE | 379938 | B | 10/1975 |
| WO | 9010488 | A1 | 9/1990 |
| WO | 9426387 | A1 | 11/1994 |
| WO | 0156681 | A1 | 8/2001 |
| WO | 0166474 | A2 | 9/2001 |
| WO | 02094421 | A1 | 11/2002 |
| WO | 2005016498 | A1 | 2/2005 |
| WO | 2008046139 | A1 | 4/2008 |
| WO | 2008130885 | A2 | 10/2008 |
| WO | 2008141413 | A1 | 11/2008 |
| WO | 2009120384 | A2 | 10/2009 |
| WO | 2010094115 | A1 | 8/2010 |
| WO | 2010148517 | A1 | 12/2010 |
| WO | 2011106848 | A1 | 9/2011 |
| WO | 2012019310 | A1 | 2/2012 |
| WO | 2012036935 | A1 | 3/2012 |
| WO | 2012105847 | A1 | 8/2012 |
| WO | 2012145712 | A2 | 10/2012 |
| WO | 2014077888 | A1 | 5/2014 |
| WO | 2014130043 | A1 | 8/2014 |
| WO | 2015142586 | A2 | 9/2015 |

OTHER PUBLICATIONS

Soraunet, "Assessment of Theoretical and Practical Aspects of the Salsnes Filtration Unit," Civil and Environmental Engineering, Jun. 2012, 90 pages.

Stricker et al, "Pilot Scale Testing of a New Configuration of the Membrane Aerated Biofilm Reactor (MABR) to Treal High-Strength Industrial Sewage," Water Environ Res, Jan. 2011, vol. 83 (1), pp. 3-14.

Strom, "Technologies to Remove Phosphorus from Wastewater," Aug. 2006, pp. 1-8.

Sutton et al., "Treating Municipal Wastewater with the Goal of Resource Recovery," Water Science & Technology, 2011, vol. 63 (1), pp. 25-31.

Syron et al., "Membrane-Aerated Biofilms for High Rate Biotreatment: Performance Appraisal, Engineering Principles, Scale-up, and Development Requirements," Environmental Science & Technology, Mar. 2008, vol. 42 (6), pp. 1833-1844.

Twarowska-Schmidt et al., "Melt-Spun Asymmetric Poly (4-methyl-1-pentene) Hollow Fibre Membranes," Journal of Membrane Science, Dec. 1997, vol. 137 (1-2), pp. 55-61.

U.S. Appl. No. 10/777,204, Final Office Action dated Feb. 22, 2006.

U.S. Appl. No. 10/777,204, Non-Final Office Action dated Sep. 26, 2005.

U.S. Appl. No. 10/801,660, Non-Final Office Action dated Dec. 30, 2005.

U.S. Appl. No. 10/895,959, Non-Final Office Action dated Feb. 23, 2007.

U.S. Appl. No. 10/896,086, Non-Final Office Action dated Nov. 1, 2006.

U.S. Appl. No. 11/202,082, Non-Final Office Action dated Mar. 21, 2006.

U.S. Appl. No. 11/203,197, Non-Final Office Action dated Jan. 10, 2007.

U.S. Appl. No. 11/357,051, Non-Final Office Action dated Jan. 16, 2007.

U.S. Appl. No. 11/722,590, Non-Final Office Action dated Apr. 3, 2009.

(56) References Cited

OTHER PUBLICATIONS

U.S. Appl. No. 11/722,590, Notice of Allowance dated Sep. 30, 2009.
U.S. Appl. No. 11/949,383, Final Office Action dated Feb. 23, 2009.
U.S. Appl. No. 11/949,383, Non-Final Office Action dated Jun. 12, 2009.
U.S. Appl. No. 11/949,383, Non-Final Office Action dated Sep. 24, 2008.
U.S. Appl. No. 11/949,383, Notice of Allowance dated Jan. 8, 2010.
U.S. Appl. No. 14/769,372, Non-Final Office Action dated Dec. 2, 2016.
U.S. Appl. No. 14/769,461, Advisory Office Action dated May 11, 2020.
U.S. Appl. No. 14/769,461, Final Office Action dated Apr. 29, 2020.
U.S. Appl. No. 14/769,461, Final Office Action dated Mar. 14, 2019.
U.S. Appl. No. 14/769,461, Non-Final Office Action dated Mar. 2, 2018.
U.S. Appl. No. 14/769,461, Non-Final Office Action dated Nov. 5, 2019.
U.S. Appl. No. 14/769,461, Notice of Allowance dated May 22, 2020.
U.S. Appl. No. 14/769,461, Restriction Requirement dated Dec. 18, 2017.
U.S. Appl. No. 16/178,974, Non Final Office Action dated Jul. 27, 2022.
U.S. Appl. No. 16/178,974, Advisory Action dated Dec. 3, 2021.
U.S. Appl. No. 16/178,974, Advisory Action dated Jan. 9, 2023.
U.S. Appl. No. 16/178,974, Advisory Action dated Jun. 9, 2022.
U.S. Appl. No. 16/178,974, Final Office action dated Apr. 5, 2022.
U.S. Appl. No. 16/178,974, Final Office Action dated Nov. 1, 2022.
U.S. Appl. No. 16/178,974, Final Office Action dated Oct. 22, 2020.
U.S. Appl. No. 16/178,974, Final office Action dated Oct. 7, 2021.
U.S. Appl. No. 16/178,974, Non-Final Office Action dated Dec. 21, 2021.
U.S. Appl. No. 16/178,974, Non-Final Office Action dated Jan. 14, 2020.
U.S. Appl. No. 16/178,974, Non-Final Office Action dated Jun. 25, 2021.
U.S. Appl. No. 16/178,974, Non-Final Office Action dated Jun. 5, 2020.
U.S. Environmental Protection Agency, "Municipal Nutrient Removal Technologies Reference Document", cPA 832-R-08-006, Sep. 2008, 449 pages.
Wang et al., "Nitritation Performance and Biofilm Development of CO-and Counter-Diffusion Biofilm Reactors Modelling and Experimental Comparison," Water Res, Jun. 2009, vol. 43 (10), pp. 2699-2709.
Wei et al., "Mixed Pharmaceutical Wastewater Treatment by Integrated Membrane-Aerated Biofilm Reactor (MABR) System—A Pilot-scale Study," Bioresource Technology, 2012, vol. 122, pp. 189-195.
Woolard, "The Advantages of Periodically Operated Biofilm Reactors for the Treatment of Highly Variable Wastewater," Water Science and Technology, Dec. 1997, vol. 35 (1), pp. 199-206.
Xin Wei et al., "Mixed pharmaceutical wastewater treatment by integrated membrane-aerated biofilm reactor (MABR) system—A pilot-scale study," Bioresource Technology, vol. 122, pp. 189-195 (Jun. 29, 2012).
Xing et al., "Microfiltration-Membrane-Coupled Bioreactor for Urban Wastewater Reclamation," Desalination, Dec. 2001, vol. 141 (1), pp. 63-73.
Yamagiwa et al., "Simultaneous Organic Carbon Removal and Nitrification by Biofilm Formed on Oxygen Enrichment Membrane," Journal of Chemical Engineering of Japan, Oct. 1994, pp. 638-643.
Yaoliang et al., "New Technologies for Biological Wastewater Treatment: Theory and Application," China Environmental Science Press, Version 2, p. 338.
Yeh et al., "Pure Oxygen Fixed Film Reactor," Journal of the Environmental Engineering Division, Aug. 1978, vol. 104 (4), pp. 611-623.
Ferrero, "Development of an Air-Scour Control System for Membrane Bioreactors," Universitat de Girona, 2011, 148 pages.
Gerber et al., "Interactions Between Phosphate, Nitrate and Organic Substrate in Biological Nutrient Removal Processes," Water Science and Technology, Jan. 1987, vol. 19 (1-2), pp. 183-194.
Indian Patent Application No. 201647035519, Office Action dated Aug. 28, 2019.
Indian Patent Application No. 202048006620, Office Action dated Dec. 17, 2021.
Indian Patent Application No. 7531/DELNP/2008, Office Action dated Jul. 19, 2013.
International Patent Application No. PCT/CA2004/000206, International Preliminary Report on Patentability and Written Opinion dated Aug. 19, 2005.
International Patent Application No. PCT/CA2004/000206, International Search Report dated May 19, 2004.
International Patent Application No. PCT/CA2004/001495, International Preliminary Report on Patentability and Written Opinion dated Feb. 21, 2006.
International Patent Application No. PCT/CA2004/001495, Written Opinion dated Feb. 1, 2005.
International Patent Application No. PCT/CA2004/001496, International Preliminary Report on Patentability and Writter Opinion dated Feb. 21, 2006.
International Patent Application No. PCT/CA2004/001496, Written Opinion dated Jan. 7, 2005.
International Patent Application No. PCT/CA2005/001250, International Preliminary Report on Patentability and Written Opinion dated Feb. 13, 2007.
International Patent Application No. PCT/CA2005/001250, Written Opinion dated Dec. 8, 2005.
International Patent Application No. PCT/US2013/027403, International Preliminary Report on Patentability dated Sep. 3, 2015.
International Patent Application No. PCT/US2013/027403, International Search Report dated Oct. 1, 2013.
International Patent Application No. PCT/US2013/027411, International Preliminary Report on Patentability dated Sep. 3, 2015.
International Patent Application No. PCT/US2013/027411, International Search Report dated Nov. 7, 2013.
International Patent Application No. PCT/US2013/027435, International Preliminary Search Report dated Sep. 3, 2015.
International Patent Application No. PCT/US2013/027435, International Search Report dated Sep. 9, 2013.
International Patent Application No. PCT/US2014/031321, International Preliminary Report on Patentability dated Sep. 29, 2016.
International Patent Application No. PCT/US2014/031321, International Search Report dated and Written Opinion dated Dec. 19, 2014.
International Patent Application No. PCT/US2015/019943, International Preliminary Reporton Patentability dated May 17, 2018.
International Patent Application No. PCT/US2015/019943, International Search Report and Written Opinion dated Mar. 21, 2018.
Israel Patent Application No. 247625, Office Action dated Aug. 29, 2019.
Israel Patent Application No. 247625, Office Action dated Dec. 22, 2020.
Joss et al., "Combined Nitritation-Anammox: Advances in Understanding Process Stability," Environmental Science & Technology, Nov. 2011, vol. 45 (22), pp. 9735-9742.
Korean Patent Application No. 10-2015-7025449, Intellectual Property Trial and Appeal Board Decision dated Jan. 21, 2021.
Korean Patent Application No. 10-2015-7025449, Office Action dated Feb. 17, 2020.
Korean Patent Application No. 10-2015-7025449, Office Action dated Feb. 9, 2023.
Korean Patent Application No. 10-2015-7025449, Office Action dated Jan. 31, 2019.
Korean Patent Application No. 10-2015-7025449, Office Action dated Jul. 20, 2021.

(56) References Cited

OTHER PUBLICATIONS

Korean Patent Application No. 10-2015-7025449, Office Action dated Oct. 30, 2019.
Korean Patent Application No. 10-2015-7025449, Office Action dated Oct. 6, 2022.
Korean Patent Application No. 10-2016-7028984, Office Action dated Apr. 28, 2022.
Korean Patent Application No. 10-2016-7028984, Office Action dated Feb. 3, 2022.
Korean Patent Application No. 10-2016-7028984, Office Action dated Jul. 28, 2021.
Korean Patent Application No. 10-2020-7002799, Office Action dated Feb. 18, 2020.
Korean Patent Application No. 10-2020-7002799, Office Action dated Jan. 28, 2021.
Korean Patent Application No. 10-2020-7002799, Office Action dated Mar. 19, 2021.
Korean Patent Application No. 10-2020-7008099, Office Action dated Feb. 9, 2023.
Korean Patent Application No. 10-2020-7008099, Office Action dated Jan. 25, 2021.
Korean Patent Application No. 10-2022-7033431, Office Action dated Oct. 28, 2022.
Li et al., "Membrane Aerated Biofilm Reactors: A Brief Current Review," Recent Patents on Biotechnology, 2008, vol. 2, pp. 88-93.
Liang, et al., "Electronic Technology Training Course," China Electric Power Press, 2009, pp. 189.
Lindeke et al., "The Role and Production of VFAs in a Highly Flexible BNR Plant," WEFTEC, Jan. 2005, pp. 1151-1173.
Ljunggren, "Micro Screening in Wastewater Treatment—An Overview," Vatten, 2006, vol. 62, pp. 171-177.
Marcelo et al., "The Air-Based Membrane Biofilm Reactor (MBFR) for Energy Efficient Wastewater Reatment", WEFTEC 2012: Session 71 through Session 80, pp. 5458-5485.
Martin et al., "The Membrane Biofilm Reactor (MBfR) for Water and Wastewater Treatment: Principles, Applications, and Recent Developments," Bioresource Technology, Oct. 2012, vol. 122, pp. 83-94.
Narayanan et al, "Fermentation of Return Activated Sludge to Enhance Biological Phosphorus Removal." WEFTEC, 2002, 7 pages.
Semmens et al., "COD and Nitrogen Removal by Biofilms Growing on Gas Permeable Membranes," Water Research, Elsevier, Nov. 1, 2003, vol. 37(18), pp. 4343-4350.
Korean Patent Application No. 10-2020-7008099, Office Action dated Nov. 14, 2023.
Korean Patent Application No. 10-2020-7008099, Office Action dated Mar. 25, 2024.
"Drainage Facility Standards," Korea Water and Wastewater Association, 2011, pp. 298, 378, 394, 395, 531.
Australian Patent Application No. 2019203733, Office Action dated Jul. 16, 2020.
Australian Patent Application No. 2019203733, Office Action dated Mar. 20, 2020.
Australian Patent Application No. AU2013378841, Office Action dated Sep. 14, 2017.
Barajas et al., "Fermentation of a Low VFA Wastewater in an Activated Primary Tank," Water SA, Jan. 2002, vol. 28 (1), pp. 89-98.
Barnard et al., "Using Alternative Parameters to Predict Success for Phosphorus Removal in WWTP's," WEFTEC, 2005, pp. 1970-1984.
Baur et al., "Primary Sludge Fermentation—Results From Two Full-Scale Pilots at South Austin Regional (TX, USA) and Durham AWWTP (OR, USA)," WEFTEC, 2002, 23 pages.
Brindle et al., "Nitrification and Oxygen Utilisation in a Membrane Aeration Bioreactor," Journal of Membrane Science, Jun. 1998, vol. 144 (1-2), pp. 197-209.
Canadian Patent Application No. 2,901,764, Office Action dated Jul. 12, 2019.

Canadian Patent Application No. 2,901,764, Office Action dated Nov. 22, 2018.
Canadian Patent Application No. 2,943,072, Office Action dated Feb. 1, 2022.
Canadian Patent Application No. 2,943,072, Office Action dated Sep. 8, 2022.
Casey et al., "Review of Membrane Aerated Biofilm Reactors," Resources, Conservation and Recycling, Jul. 1999, vol. 27 (1-2), pp. 203-215.
Chen, Guanwen et al., "Recent Advances in Membrane Technology and Engineering Applications", National Defense Industry Press, Aug. 2013, pp. 164-165.
Chinese Patent Application No. 200480004060.5, Office Action dated Dec. 15, 2006.
Chinese Patent Application No. 201380073639.6, Office Action dated Apr. 25, 2016.
Chinese Patent Application No. 201380073677.1, Office Action dated Jul. 21, 2016.
Chinese Patent Application No. 201380073677.1, Office Action dated Mar. 10, 2017.
Chinese Patent Application No. 201380073696, Office Action dated Feb. 25, 2019.
Chinese Patent Application No. 201380073696, Office Action dated Jul. 25, 2019.
Chinese Patent Application No. 201380073696.4, Office Action dated Jun. 12, 2016.
Chinese Patent Application No. 201380073696.4, Reexamination Decision dated Jan. 16, 2020.
Chinese Patent Application No. 201580026027.0, Office Action and Search Report dated Jul. 19, 2022.
Chinese Patent Application No. 201580026027.0, Office Action dated Aug. 31, 2020.
Chinese Patent Application No. 201580026027.0, Office Action dated Jan. 30, 2022.
Chinese Patent Application No. 201580026027.0, Office Action dated Jan. 6, 2020.
Chinese Patent Application No. 201580026027.0, Office Action dated Mar. 23, 2021.
Chinese Patent Application No. 201580026027.0, Office Action dated Nov. 3, 2022.
Chinese Patent Application No. 202010227987.6, Office Action dated Jul. 18, 2022.
Chinese Patent Application No. 202010227987.6, Office Action dated Mar. 7, 2022.
Chinese Patent Application No. 202010227987.6, Office Action dated Sep. 3, 2021.
Chinese Patent Application No. 202010300259.3, Office Action dated May 16, 2022.
Chinese Patent Application No. 202010300259.3, Office Action dated Oct. 11, 2021.
Chinese Patent Application No. 202010300259.3, Office Action dated Oct. 21, 2023.
Chinese Patent Application No. CN201380073696.4, Office Action dated Nov. 6, 2017.
Cote et al., "Bubble-free aeration using Membranes: Mass Transfer Analysis," Journal of Membrane Science, Nov. 1989, vol. 47 (1-2), pp. 91-106.
Cote et al., "Bubble-Free Aeration Using Membranes: Process Analysis," Journal Water Pollution Control Federation, Nov. 1998, vol. 60 (11), pp. 1986-1992.
Cui et al., "Innovative Application of Carbon Tube Aerated Membranes to Enhance Anaerobic Baffled Reactor for Wastewater Treatment," Environmental Science, May 2008, vol. 29(5), pp. 1216-1220.
Diamond et al., "Model of Sustainability," Water & Wastes Digest, Sep. 2013, pp. 34-35, [retrieved on Jul. 3, 2015], Retrieved from the Internet: [URL:https://www.gewater.com/kcpguest/documents/TechnicalPapers_Cust/Americas/English/WaterWastesDigest_T . . . .

Downing et al, "Nitrogen Removal from Wastewater Using a Hybrid Membrane-Biofilm Process:Pilot-Scale Studies," Water Environment Research, Mar. 2010, vol. 82 (3), pp. 195-201.

(56) References Cited

OTHER PUBLICATIONS

Downing et al., "Effect of Bulk Liquid BOD Concentration on Activity and Microbial Community Structure of a Nitrifying, Membrane-Aerated Biofilm," Applied Microbiology and Biotechnology, Nov. 2008, vol. 81 (1), pp. 153-162.
Envities, Lamella Sedimentation Tanks and Clarifiers, Nov. 21, 2010, pp. 1-4.
European Application No. 20164903.5, Communication pursuant to Rule 69 EPC, dated Aug. 31, 2020.
European Patent Application No. 05774824.6, Office Action dated Apr. 16, 2008.
European Patent Application No. 05774824.6, Office Action dated Aug. 13, 2009.
European Patent Application No. 05774824.6, Supplementary Partial European Search Report dated Jan. 25, 2008.
European Patent Application No. 13709632.7, Communication pursuant to Article 94(3) EPC dated Jun. 27, 2017.
European Patent Application No. 15713275.4, Communication pursuant to Article 94(3) EPC dated Apr. 3, 2020.
European Patent Application No. 20164903.5, European Communication dated Mar. 15, 2023.
European Patent Application No. 20164903.5, Extended European Search Report dated Jul. 20, 2020.

\* cited by examiner

MEMBRANE ASSEMBLY FOR SUPPORTING A BIOFILM

CROSS-REFERENCE TO RELATED APPLICATIONS

This application is a continuation of U.S. application Ser. No. 16/998,704, filed Aug. 20, 2020, which is a of continuation of U.S. application Ser. No. 14/769,461, filed Aug. 21, 2015, issued on Sep. 22, 2020 as U.S. Pat. No. 10,781,119, which is a National Stage Entry of International Application No. PCT/US2013/027435, filed Feb. 22, 2013. U.S. application Ser. Nos. 16/998,704 and 14/769,461 and International Application No. PCT/US2013/027435 are incorporated herein by reference.

FIELD

This specification relates to wastewater treatment, to membrane biofilm reactors, and to assemblies of gas permeable membranes for supporting a biofilm.

BACKGROUND

In a membrane biofilm reactor (MBfR), a membrane is used to both support a biofilm and to transport a gas to the biofilm. Membrane biofilm reactors were recently reviewed by Martin and Nerenberg in "The membrane biofilm reactor (MBfR) for water and wastewater treatment: Principles, applications, and recent developments" (Bioresour. Technol. 2012). Membrane-aerated biofilm reactors (MABR) are a subset of MBfRs in which an oxygen containing gas is used. MABRs were reviewed by Syron and Casey in "Membrane-Aerated Biofilms for High Rate Biotreatment: Performance Appraisal, Engineering Principles, Scale-up, and Development Requirements" (Environmental Science and Technology, 42(6): 1833-1844, 2008).

U.S. Pat. No. 7,169,295 describes a membrane supported biofilm reactor with modules having fine hollow fiber membranes. The membranes are made from dense wall polymethyl pentene (PMP) used in tows or formed into a fabric. The membranes are potted in a header of a module to enable oxygen containing gas to be supplied to the lumens of the hollow fibers. The reactor may be used to treat wastewater. Mechanical, chemical and biological methods are used to control the thickness of the biofilm.

SUMMARY OF THE INVENTION

This specification describes an assembly, alternatively called a cord, which may be used for supporting a biofilm. The cord comprises a plurality of hollow fiber gas transfer membranes. The cord may optionally also comprise one or more reinforcing filaments.

The cord may comprise a plurality of yarns. At least one of the yarns comprises a plurality of gas transfer membranes. At least one of the yarns extends along the length of the cord generally in the shape of a spiral. In some cases, the cord has a core and one or more wrap yarns. In some other cases, the cord comprises a set of braided yarns.

The cord preferably has an outside diameter in the range of about 0.3 mm to 2.0 mm. The gas transfer membranes preferably have an outside diameter that is less than 200 microns. The sum of the circumferences of the gas transfer membranes is preferably at least 1.5 times the circumference of the smallest circle that can surround the cord. In use, a biofilm covers the cord and the outer surface of the biofilm is substantially round.

A module may be made by potting a plurality of cords in at least one header. The cords are generally independent of each other except in the header. A reactor may be made by placing the module in a tank adapted to hold water to be treated and providing a gas delivery system. A process for treating wastewater comprises steps of feeding water to the tank and supplying a gas to the module. In use, a biofilm may cover a cord to form a membrane biofilm assembly.

The cord, module, reactor and process may be used to treat water, for example in, or in the manner of, an MBfR.

DETAILED DESCRIPTION

Figure 1:
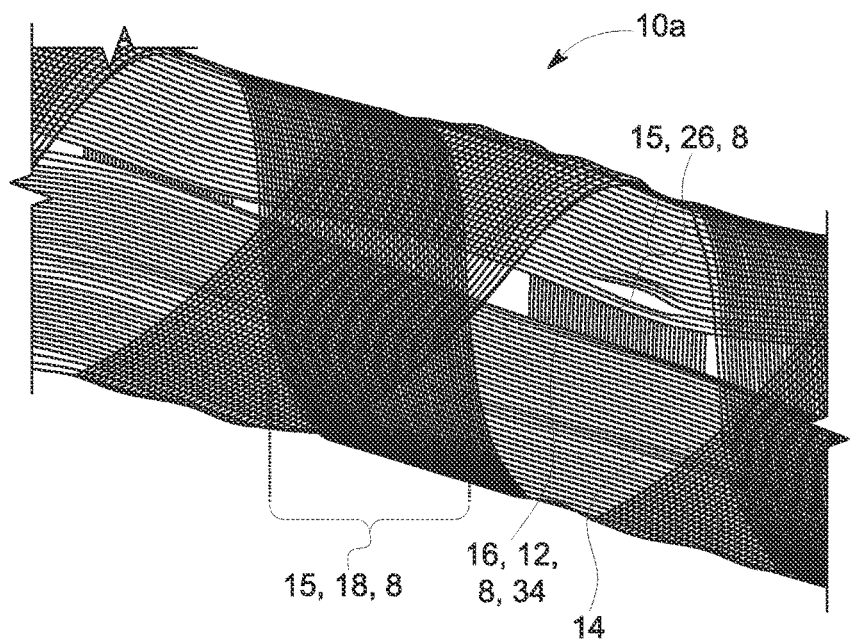
FIG. 1 is a photograph of a cord.

FIGS. 1 to 4 and FIGS. 11 to 14 each show a cord 10 comprising a plurality of yarns 8. At least one of the yarns 8 comprises a plurality of hollow fiber gas transfer membranes 14. Preferably, at least one of the yarns 11 comprises at least one reinforcing filament 34.

At least one of the yarns 8 extends along the length of the cord 10 generally in the shape of a spiral and may be referred to as a spiral yarn. Preferably, at least one spiral yarn 8 is wrapped at least partially around the outside of the other yarn or yarns 8 of the cord 10.

In the cords 10 of FIGS. 1 to 4 and FIGS. 11 to 14, the yarns 8 are arranged to provide a core 12 and one or more wraps 18. A wrap 18 travels in a spiral that is always outside of another yarn 8. For example, a wrap 18 may spiral around a core 12, or around one or more other wraps 18 that spiral around the core 12. An only or outer wrap 18 is located entirely outside of the other yarn or yarns 8 of a cord 10. Alternatively, a spiral yarn 8 may be wrapped only partially outside of the other yarns or yarns 8 or a cord. For example, two or more spiral yarns 8 may be twisted around each other or four or more spiral yarns 8 may be braided together to form a cord 10 with no wrap 18. In another alternative, four or more spiral yarns 8 may be braided together around a core 12.

Each cord 10 has a plurality of hollow fiber gas transfer membranes 14. The gas transfer membranes 14 may be located in a core 12, in one or more wraps 18, or in another yarn 8. The gas transfer membranes 14 are preferably provided in the form of a multi-filament yarn having a plurality of gas transfer membranes which may be called a gas transfer membrane yarn 15. Optionally, a cord may also have a reinforcing yarn 16. The reinforcing yarn has one or more reinforcing filaments 34. A yarn 8 having both a plurality of gas transfer membranes 14 and at least one reinforcing filament 34 may be called both a gas transfer membrane yarn 15 and a reinforcing yarn 16.

The outside diameter of a cord 10 is preferably in a range of about 0.3 to 2.0 mm. The outside diameter of the cord 10 may be measured as the largest width of a cord measured through its longitudinal axis or as the diameter of the smallest hole that the cord 10 will pass through. Anomalies, defects or non-repeating bumps are ignored in these measurements.

Generally speaking, a core 12 provides mechanical strength, defines a longitudinal axis of the cord 10, supports any wraps 18, and may also comprise gas transfer membranes 14. A wrap 18, or other yarn outside of the core 12, may do one or more of: protect the core 12 or another underlying yarn 8, comprise gas transfer membranes 14, or contribute to the mechanical strength of the cord 10.

A core 12 can be made of one or more monofilament yarns or multi-filament yarns. A Multi-filament yarn may comprise filaments that are braided, twisted or otherwise united, or filaments that are merely collected together in a bundle or tow. Multiple yarns may be arranged as parallel warp yarns or twisted, braided or otherwise united. For example a core 12 may consist essentially of a single monofilament yarn; a single multi-filament yarn; or, an assembly of about 2 to 6 monofilament or multi-filament yarns arranged in parallel or twisted or braided together. An assembly of twisted or braided yarns may be preferred since the assembly will be more flexible than a single monofilament of the same outer diameter. A core 12 typically, but not necessarily, comprises at least one reinforcing yarn 16. A core 12 may optionally comprise one or more gas transfer membrane yarns 15.

A wrap 18 is typically a multi-filament yarn. A multi-filament yarn may comprise filaments that are twisted or otherwise united or filaments that are merely collected together in a bundle or tow. A wrap 18 can be wrapped around a core 12 in a clockwise spiral or a counterclockwise spiral. Alternatively, a cord 10 may have at least one wrap 18 in each direction or no wrap 18. A wrap 18 can be a gas transfer membrane yarn 15, a reinforcing yarn 16, or both.

A reinforcing filament 34 can be made of any water-resistant and non-biodegradable polymer such as polyethylene, nylon or polyester, preferably nylon or polyester. A reinforcing filament 34 is typically solid. Gas transfer membranes 14 tend to be expensive and weak relative to reinforcing filaments 34 made of common textile polymers such as nylon or polyester. A reinforcing yarn 16 can be a monofilament or multi-filament yarn. In the case of a multi-filament yarn, the reinforcing filaments 34 may be braided, twisted or otherwise united, or filaments that are merely collected together in a bundle or tow. Optionally, a yarn 8 may comprise one or more reinforcing filaments 34 mixed with the gas transfer membranes 14.

The gas transfer membranes 14 preferably have an outside diameter of 500 microns or less, more preferably 200 microns or less, optionally 100 microns or less. The hollow area of a hollow fiber (meaning the cross sectional area of the lumen of a fiber as a percentage of its total cross sectional area) is preferably at least 20%, for example in the range of 20-50%. For example, a gas transfer membrane 14 may have an outside diameter in the range of about 30-70 microns and an inside diameter of about 15-50 microns. The wall thickness of a gas transfer membrane 14 may be 20 microns or less.

The gas transfer membranes 14 are preferably handled in a multi-filament gas transfer membrane yarn 15. A gas transfer membrane yarn 15 may have between 2 and 200, between 12 and 96, or between 10 and 60 individual filaments of gas transfer membrane 14. A gas transfer membrane yarn 15 used as a wrap 18 is preferably not tightly twisted, braided or crimped to allow the individual gas transfer membranes 14 to spread out over an underlying yarn 8. A gas transfer membrane yarn 15 may be made by re-winding gas transfer membranes 14 from multiple take up spools in combination onto another spool.

A gas transfer membrane yarn 15 may be provided, in a core 12, either as a central yarn or as a warp parallel to a central reinforcing yarn 16; in one or more wraps 18; or, in another spiral yarn 8. It is desirable for gas transfer efficiency to have the gas transfer membranes 14 near the outer surface of the cord 10. However, the gas transfer membranes 14 are typically fragile and they are more likely can be damaged if they form the outer surface of a cord 10. Accordingly, it is preferable for a reinforcing yarn 16 to be used as an outer wrap 18. In this case, a gas transfer membrane yarn 15 may be used in the core 12 or in an inner wrap 18.

The gas transfer membranes 14 may be porous, non-porous or semi-porous. Composite membranes, for example having a non-porous membrane layer, and a semi-porous or porous support layer, may also be used. Asymmetric membranes, for example having a non-porous region and an integral semi-porous or porous region, may also be used.

Porous gas transfer membranes 14 may have pores up to the microfiltration range. Wetting is avoided by choosing hydrophobic materials or treating the hollow fibers 14 to make them hydrophobic. Porous hollow fibers 14 may be made, for example, using polyethylene, polyvinylchloride, polypropylene or polysulfone.

Non-porous gas transfer membranes 14, including dense wall gas transfer membranes 14, may be made from a thermoplastic polymer, for example a polyolefin such as polymethyl pentene (Poly (4-methylpentene-1) or PMP), polyethylene (PE) or polypropylene (PP). PMP is sold, for example, by Mitsui Petrochemical under the trade mark TPX. The polymer may be melt spun into a hollow fiber. The gas transfer membranes 14 may be called non-porous if water does not flow through the fiber walls by bulk or advective flow of liquid even though there are small openings through the wall, typically in the range of 4 or 5 Angstroms in the case of melt spun PMP. However, oxygen or other gases may permeate or travel through the fiber walls. In a dense walled hollow fiber 14, gas travel is primarily by molecular diffusion or dissolution-diffusion which occurs when openings in the fiber walls are generally less than 30 Angstroms. Gas transfer membranes 14 as described in U.S. Pat. No. 7,169,295, which is incorporated by reference, may be used.

The term porous has been used to refer to any structure having openings larger than in a dense wall, for example having openings of 30 or 40 Angstroms or more, but without openings large enough to be wetted or transport liquid water by advective, Poiseuille or bulk flow. In this specification, membranes with openings in this size range are referred to as semi-porous.

Gas transfer membranes 14 may alternatively be made by mechanically or thermally treating a melt spun thermoplastic polymer after spinning to increase its permeability to oxygen without making the fiber wettable or capable of permitting advective flow of liquid water. Spinning or post-treatment steps that can be used or controlled to increase permeability include the spinning speed or drawing ratio, the quenching conditions such as temperature or air flow rate, post annealing, if any, stretching and heat setting. The resulting fibers may have a dense layer, with openings ranging from the size of openings in the raw polymer to 30 or 40 Angstroms, on either the inside of the fiber, the outside of the fiber or both, with the remaining parts of the fiber being porous or semi-porous. For example, U.S. Pat. No. 4,664,681, issued on May 12, 1997, to Anazawa et al. describes, in examples 4 and 6, processes for melt-spinning and post-processing PE and PP to produce acceptable fibres while other fibers are made from PMP or polyoxymethylene. Processes described in "Melt-spun Asymmetric Poly (4-methyl-1-pentene) Hollow Fibre Membranes", Journal of Membrane Science, 137 (1997) 55-61, Twarowska-Shmidt et al., also produce acceptable fibres of PMP and may be adopted to produce fibres of other polyolefins such as PE or PP. In one example, the mean pore size of the fibers produced is just over 40 Angstroms. In U.S. Pat. No. 4,664,681, membranes are melt spun, stretched (by producing the membrane at a high draft ratio) under weak cooling and then heat treated. The resulting membranes are asymmetric containing a dense layer with substantially no pore with a diameter of 30 Angstroms or more and a microporous layer having larger pores. The non-porous layer is the outer surface of the fiber and so the fiber is non-wetting.

Another alternative process for making gas transfer membranes 14 is to make an asymmetric outside dense skin membrane with a spongy substructure by the non-solvent induced phase separation (NIPS) process. Polymers typically used for this process are polysulfone, cellulose acetate and polyimide. Other alternative methods of making gas transfer membranes 14 may include, for example, melt-blown extrusion, flash spinning, and electrospinning.

In general, silicon rubber or PDMS have very high oxygen permeability but cannot be processed using many textile techniques and are not available in small diameter fibers. PMP has higher oxygen permeability than PE or PP, but it is more expensive. Porous membranes have high oxygen permeability but they are prone to wetting in use. Accordingly, dense wall polymeric gas transfer membranes 14, for example of PE. PP or PMP, with a wall thickness of 50 microns or less, preferably 20 microns or less, or polymeric membranes that are not entirely dense walled but have a nonporous or semi-porous layer, are preferred but not essential.

A yarn 8 in a core 12, whether it is a gas transfer yarn 15 or a reinforcing yarn 16, may be called a warp 26. A wrap 18 is preferably applied around a core 12 or another underlying yarn 8 with some tension to cause its filaments to spread on the surface of the core 12. Wrapping may be done with a pitch ratio (pitch divided by the diameter of the core) of between 1 and 5. Wrapping can be in one direction only, but is preferably done in both directions. There may be 1 or more, for example between 1 and 3, wraps 18 in one direction. Gas transfer membranes 14 are preferably directly exposed over at least 25% of the surface of the core 12 although oxygen can also travel from a gas transfer membrane 14 through an overlying yarn 8.

A cord 10 may consist of only a set of twisted yarns 8. However, merely twisted yarns 8 may tend to partially untwist and separate in use. Accordingly, it is preferable to use twisted yarns 8 as a core 12 with at least one wrap 18 wrapped around the core 12 in the direction opposite to the twist of the core 12. A braided core 12 is more stable. Spiral yarns 8 may be added as a braid around a core 12, but a wrap 18 can be made at a faster line speed with a less complicated machine. A cord structure using one or more wraps 18 also allows for a reinforcing yarn 16 to be used as an outer wrap 18 to help protect an interior gas transfer membrane yarn 15.

In the examples of FIGS. 1 to 4 and FIGS. 11 to 14, gas transfer membrane yarns 15 are made up of 48 dense wall PMP hollow fiber filaments. The filaments have an outside diameter of less than about 70 microns and a wall thickness of less than 20 microns. Reinforcing yarns 16 are either monofilament yarns or multi-filament yarns of polyester (PET).

Figure 11:
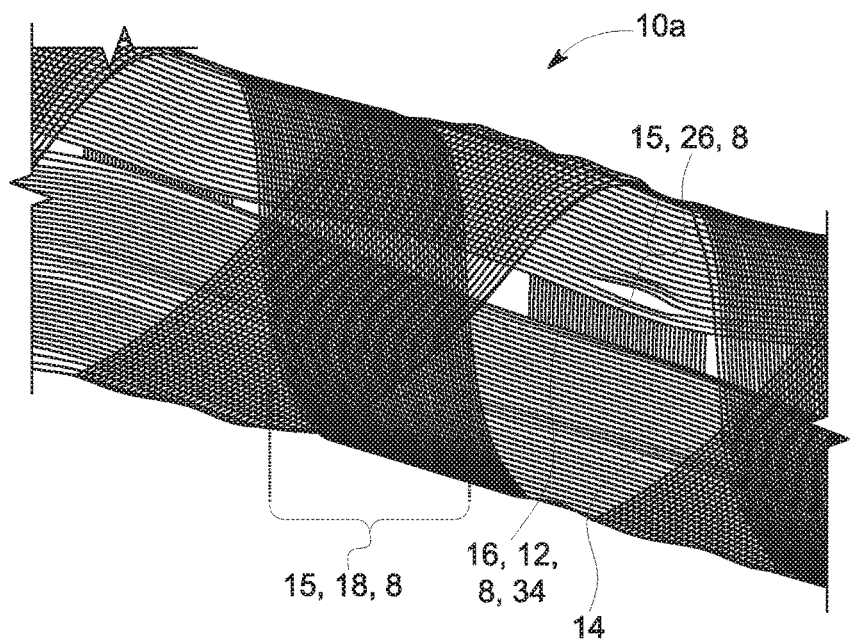
FIGS. 11 to 14 are drawings of the cords in FIGS. 1 to 4 respectively.

In FIG. 1 and FIG. 11, a first cord 10a has a core 12 made up of a single monofilament reinforcing yarn 16 and a two multi-filament gas transfer membrane yarns 15 applied as warps 26 parallel to the reinforcing yarn 16. The core 12 is covered with two wraps 18, one in each direction, with a wrapping pitch of 1.8. Each wrap 18 is a single multi-filament gas transfer membrane yarn 15.

Figure 2:
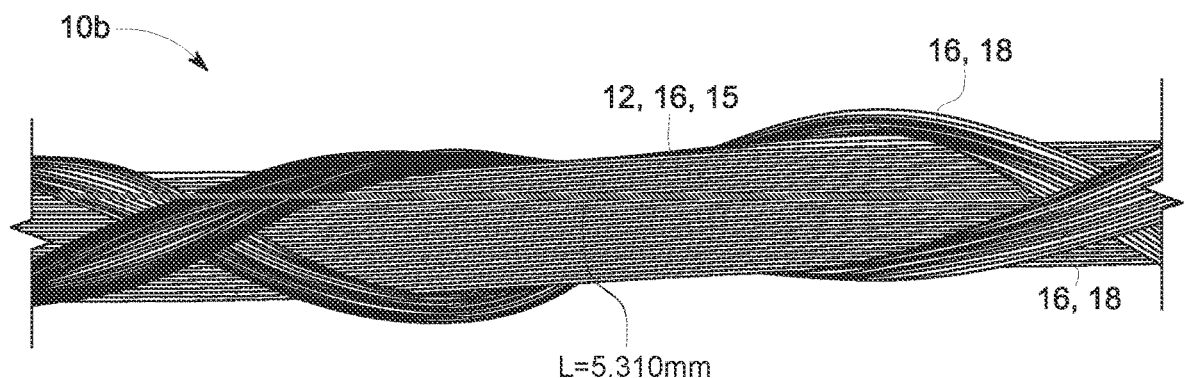
FIGS. 2 to 4 are photographs of alternative cords.
Figure 12:
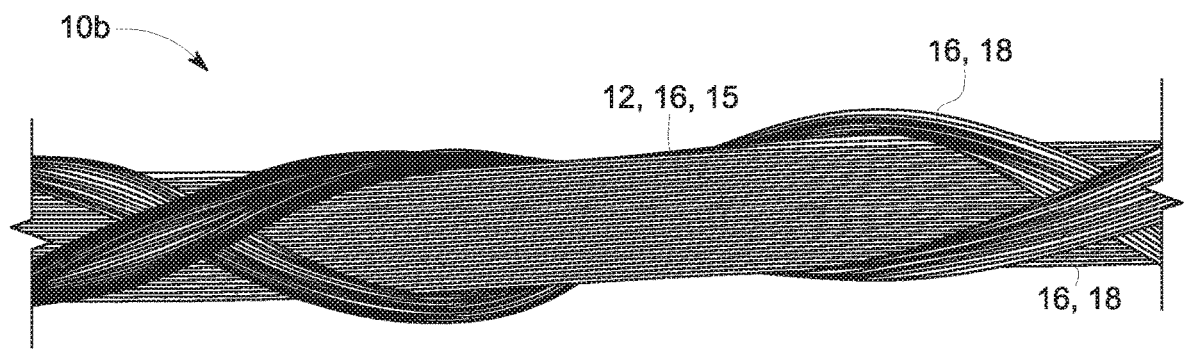

In FIG. 2 and FIG. 12, a second cord 10b has a core 12 comprising a reinforcing yarn 16 and a gas transfer membrane yarn 15. Each of these yarns in the core 12 is an untwisted multi-filament yarn, alternatively called a tow. The second cord 10b also has two wraps 18, one in each direction. Each wrap 18 is an untwisted multi-filament reinforcing yarn 16.

Figure 3:
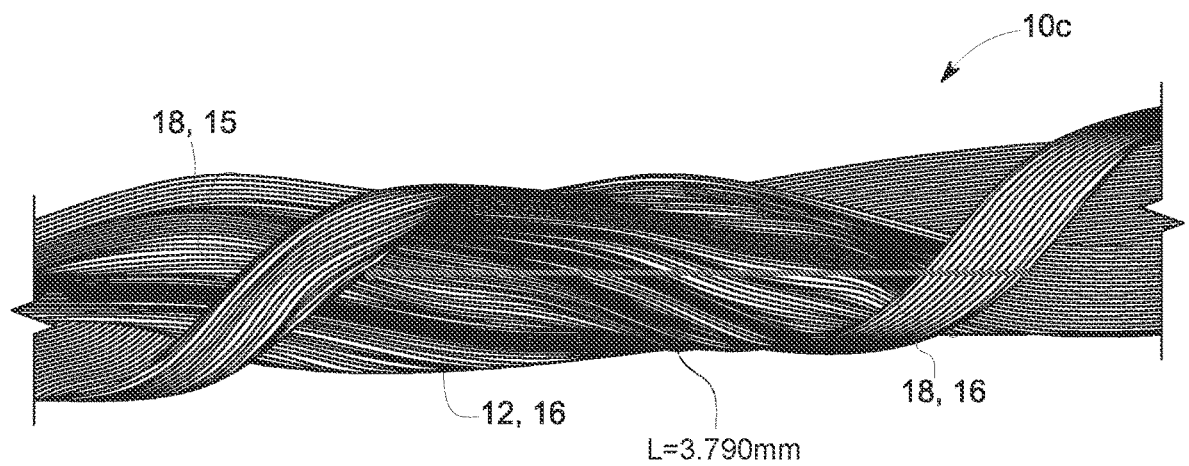
Figure 13:
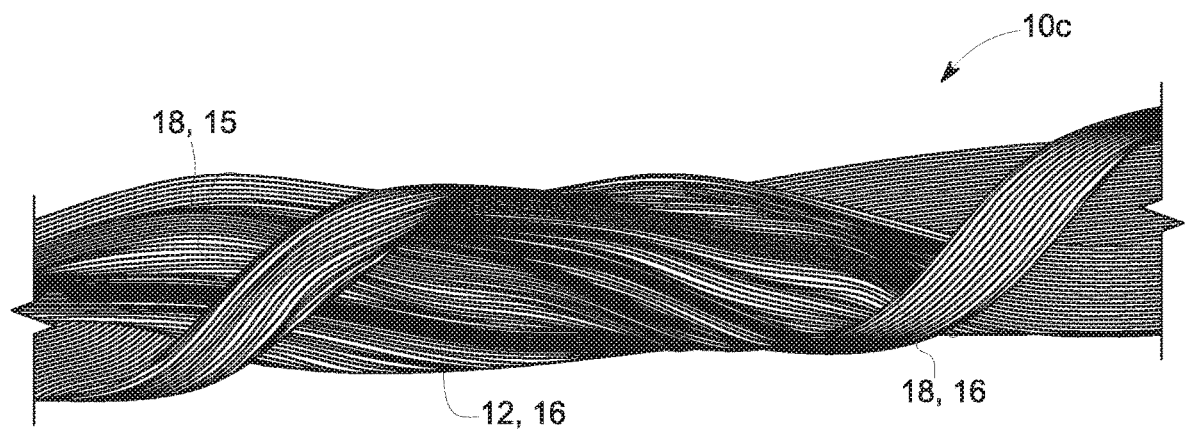

In FIG. 3 and FIG. 13, a third cord 10c has a core 12 comprising a set of multifilament reinforcing yarns 16 braided together. The third cord 10c also has an inner wrap 18 comprising an untwisted multifilament gas transfer membrane yarn 15 and an outer wrap comprising an untwisted multifilament reinforcing yarn 16.

Figure 4:
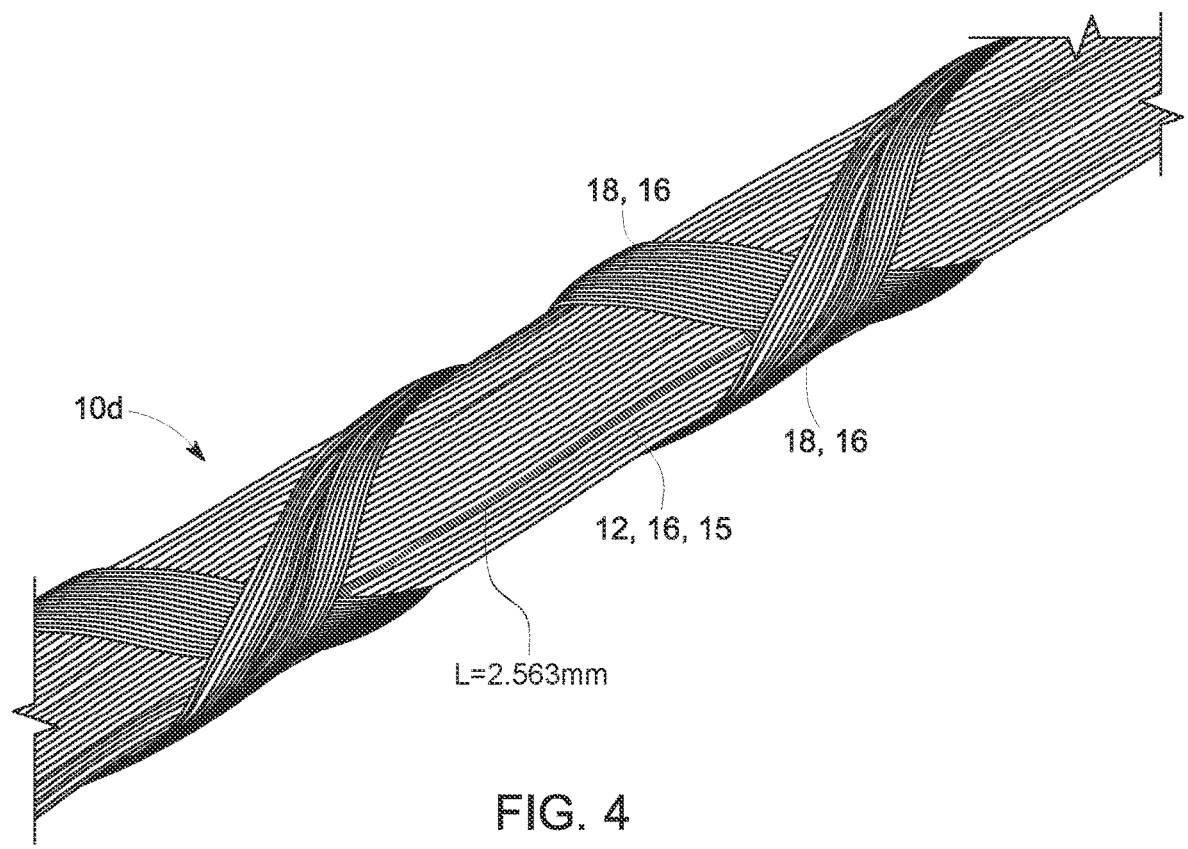
Figure 14:
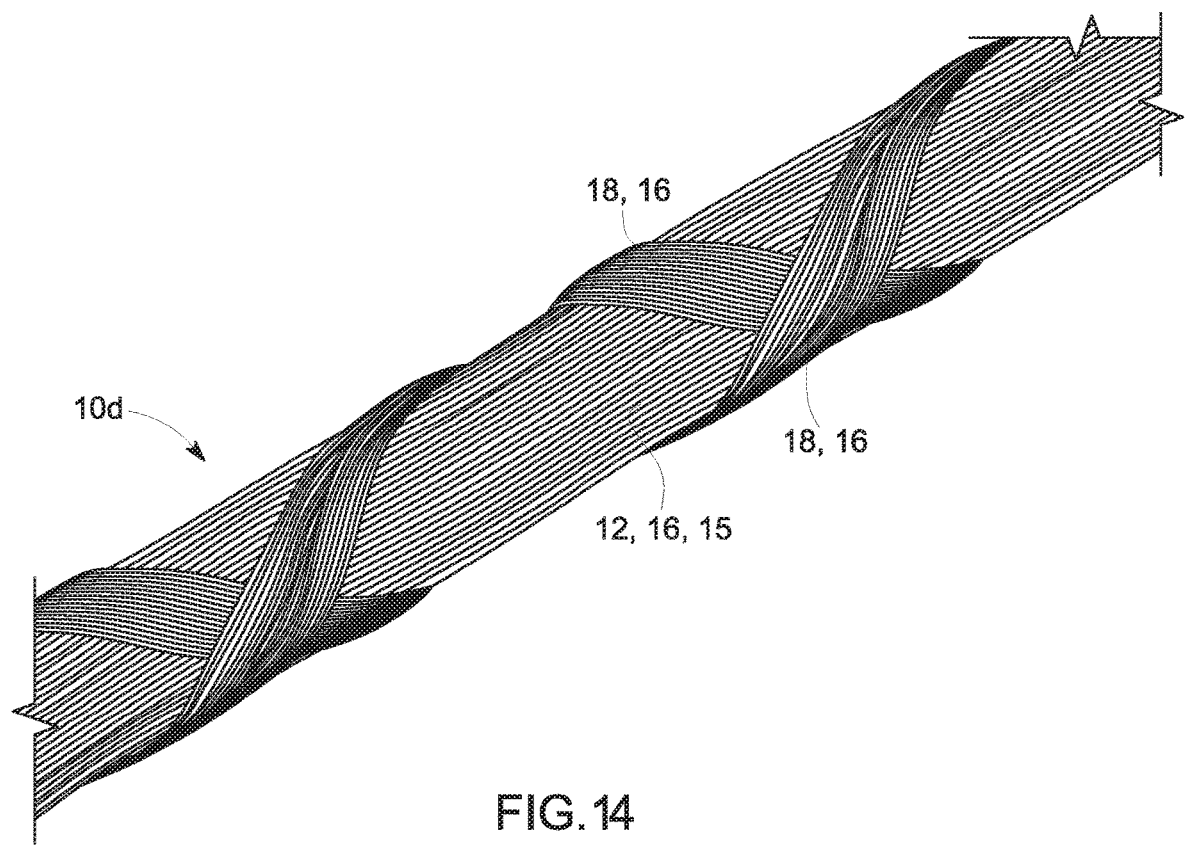

In FIG. 4 and FIG. 14, a fourth cord 10c has a core 12 comprising a set of multifilament reinforcing yarns 16 braided together and an untwisted multifilament gas transfer membrane yarn 15 as a warp 26 parallel to the reinforcing yarns 16. The gas transfer membrane yarn 15 is parallel with the core 12 but not braided with the reinforcing yarns 16. The third cord 10c also has a wrap 18 comprising an untwisted multifilament reinforcing yarn 16.

Figure 5:
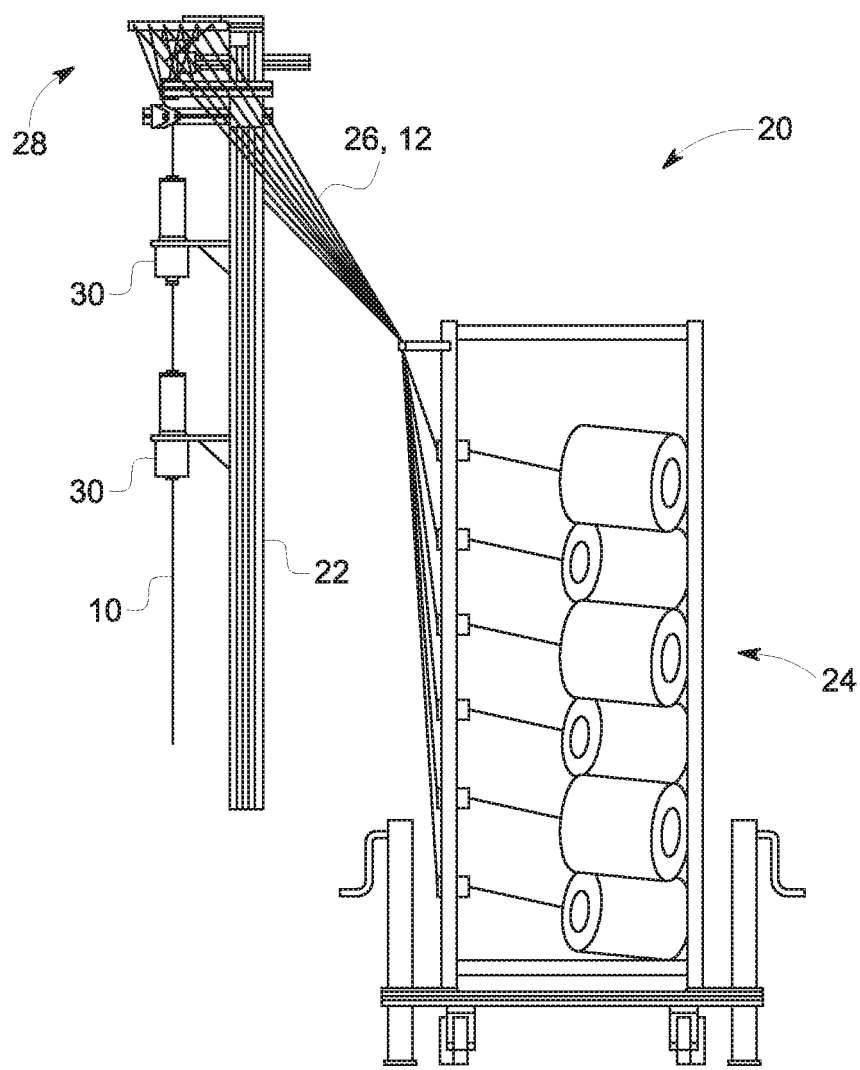
FIG. 5 is a schematic drawing of a machine for making a cord.

FIG. 5 shows a machine 20 for making a cord 10. The machine 20 is built on frame 22 that supports the different components and aligns them. One or more warps 26 are supplied to the machine 20 from a creel 24. The creel 24 has stationary bobbin holders, guides and tensioning devices, as found in other textile equipment. The warps 26 pass through a distributor 28. The distributor 28 may have a central opening and one or more eyelets around the central opening. A warp 26 is unwound from a bobbin on the creel 24, positioned to the top of the distributor 28 through a roller and fed vertically down through the distributor 28. A take up winder (not shown) pulls the cord 10 downwards through the machine 20 and onto a bobbin. The one or more warps 26 form the core 12 of the cord 10.

One or more spindles 30, or other yarn wrapping devices, are located below the distributor 28. Each spindle 30 is loaded with a yarn and wraps the yarn around the one or more warps 26 of the core 12 as they pass through the spindle 30. Due to the downward movement of the core 12, each wrapped yarn forms a spiral wrap 18. The machine 20 may also have alignment guides (not shown) to keep the core 12 aligned with the central axis of the spindles 30 and to reduce vibration of the core 12.

An example of a suitable spindle 30 is a Temco™ spindle model MSE150 by Oerlikon Textile. Each spindle 30 has an electrical motor and a hollow core and holds a bobbin of wrap yarn. The spindle 30 is positioned so that its central axis coincides with the core 12. In the machine 20 of FIG. 2, there are two spindles 30, one rotating clockwise and the other rotating counter clockwise. The spindles 30 can rotate at an adjustable speed of up to 25,000 rpm to provide a controllable pitch. Alternatively, a rotating creel may be used in place of the spindle 30. In a rotating creel, bobbins are mounted on a wheel that rotates in one direction around the core 12 without being in contact with it. Each bobbin is preferably equipped with tension control.

A plurality of cords 10, for example 100 or more, may be made into a module generally in the manner of making an immersed hollow fiber membrane filtration module. At least one end of each of the cords 10 is potted in a block of a potting material such as thermoplastic or thermosetting resin which is sealed to a pan to form a header. The ends of the gas transfer membranes 14 are made open to the inside of the header, for example by cutting them open after potting. The other ends of the cords 10 may be potted in another header with the ends of the gas transfer membranes 14 open or closed, closed individually, or looped back and potted in the first header. A port in the header allows a gas to be fed to the lumens of the gas transfer membranes 14. The gas may be fed to the gas transfer membranes 14 in a dead end manner or with exhaust through a second header.

As one example, the composite fibers 10 may be assembled into modules and cassettes according to the configuration of ZeeWeed 500™ immersed membrane filtration units sold by GE Water & Process Technologies. Sheets of cords 10 are prepared with the composite fibers 10 generally evenly spaced in the sheet. Multiple sheets are stacked on top of each other to form a bundle with adjacent sheets spaced apart from each other. The bundle is potted. After the potting material cures, it is cut to expose the open ends of the gas transfer membranes and sealed to a header pan. Several such modules may be attached to a common frame with their ports manifolded together to form a cassette. Various useful techniques that may be used or adapted for making a module are described in U.S. Pat. Nos. 7,169,295, 7,300,571, 7,303,676, US Publication 2003/01737006 A1 and International Publication Number WO 02/094421, all of which are incorporated by reference. Alternatively, other known techniques for making a hollow fiber membrane module may be used.

Figure 6:
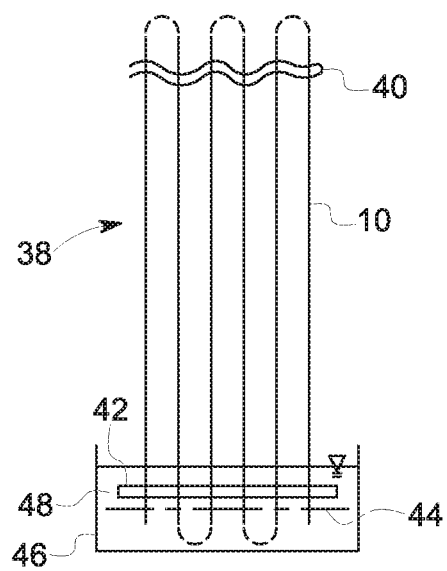
FIGS. 6 to 8 are schematic drawings of steps in a process for making a module comprising a plurality of cords.

Referring to FIG. 6, multiple cords 10, or an undulating cord 10, are laid out on a flat jig or drum to provide a set of generally parallel segments of cord 10 in a sheet 38. The segments of cord 10 may be kept evenly spaced from each other in the sheet 38, for example by a woven filament 40 or a strip of hot melt adhesive 42. When segments of cord 10 are used, the ends of the cords 10 may be sealed, for example by melting them with an iron or heated cutter along a sealing line 44. Multiple sheets 38 may be stacked on top of each other, preferably with the ends of adjacent sheets 38 separated by spacers. The end of the set of sheets 38 is dipped in a potting mold 46 filled with a potting resin 48. The potting resin 48 may be, for example, a polyurethane resin formulated to penetrate into the yarns 8 to seal around the various filaments of the cord 10.

Figure 7:
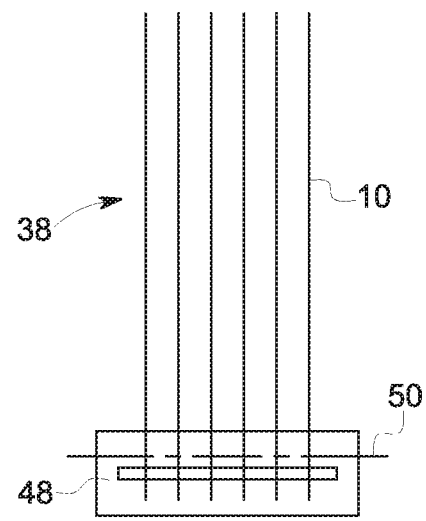

Referring to FIG. 7, the set of sheets 38 is removed from the potting mold 46 after the potting resin 48 is cured. To expose open ends of the gas transfer membranes 14, the potting resin 48 is cut through along cutting line 50. The other end of the set of sheets 38 may be potted in the same manner. Optionally, one or both of the blocks of potting resin 48 may be cut to expose open ends of the gas transfer membranes 14.

Figure 8:
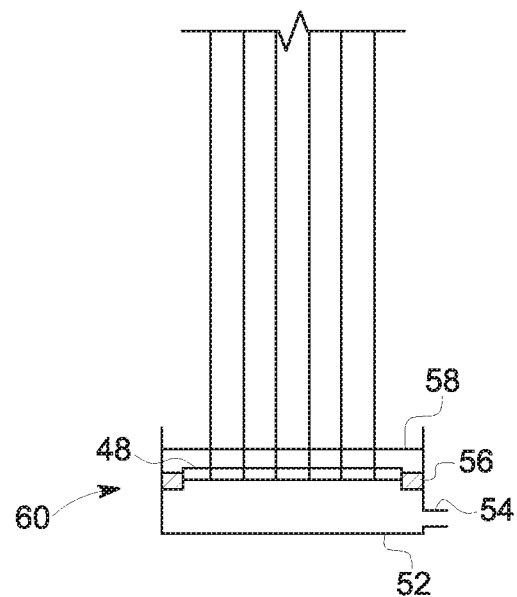

Referring to FIG. 8, a header 60 is formed by sealing the block of potting resin 48 to a header pan 52. The header pan 52 may be made of molded plastic and has an outlet 54. The block of potting resin 48 may be held in the header pan 52 by an adhesive or a gasket 56 between the perimeter of the potting resin 48 and the header pan 52. Optionally, a second potting material 58 may be pored over the potting resin 48. The second potting material may further seal the cords 10 or the potting resin 48 to the header pan 52, or may cushion the cords 10 where they exit from the header 60. A similar header 60 may be made at the other end of the set of sheets 38.

Figure 9:
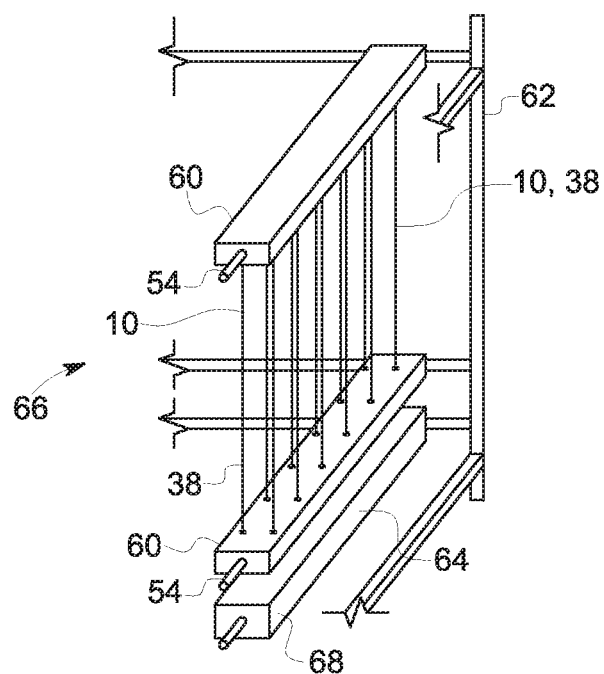
FIG. 9 is a schematic drawing of a module comprising a plurality of cords.

Referring to FIG. 9, a module 66 has two headers 60 with cords 10 extending between them. The headers 60 are preferably vertically aligned and held apart by a frame 62. The length of the cords 10 between opposing faces of the headers 60 may be slightly greater than the distance between the opposed faces of the headers 60. In this case the cords 10 have some slack and can sway. The cords 10 are preferably not connected to each other between the headers 60. Although one cord 10 may contact another as it sways, the movement of a cord 10 is generally independent of other cords 10. Multiple modules 60 may be held in a common frame 62. The frame 62 may also hold an aerator 68 near the bottom of a module 66.

When used for wastewater treatment, the cords 10 are immersed in a bioreactor and a gas, for example air, oxygen, hydrogen or another gas, is fed through the lumen of the gas transfer membranes 14. A biofilm develops on the outside surface of the cords 10, and anchors itself by filling the gaps between filaments. The resulting membrane biofilm assembly has a generally circular cross section. The cross section of the membrane biofilm assembly has a diameter of about 0.5 to 3 mm determined assuming that the biofilm forms a film extending no more than 0.5 mm beyond the outer diameter of the core 12. A more typical biofilm thickness is in the range of 0.05 to 0.2 mm. The sum of the circumferences of the gas transfer membranes 14 multiplied by the length of the cord approximates the active gas transfer surface area while the circumference of the outside of the biofilm multiplied by the length of the cord 10 gives the biofilm area. The sum of the circumferences of the gas transfer membranes 14 is preferably at least 1.5 times the circumference of a circle having the outside diameter of the cord 10. The sum of the circumferences of the gas transfer membranes 14 is also preferably at least 1.5 times the circumference of the attached biofilm when in use.

Modules of the cords 10 may be deployed in a membrane biofilm reactor (MBfR) by immersing them in an open tank in manner similar to the use of ZeeWeed 500 immersed hollow fibre filtering membranes. Although the cords 10 will be used to support and transport gas to a biofilm and not for filtration, various system design and operating features of the ZeeWeed 500 system can be adapted. As mentioned above, the cords 10 may be potted with an orderly spacing between them. The module configuration with two headers may be used but modified to use one header of each element for introducing the fresh gas and one header for venting exhausted gas. ZeeWeed cassette frames may be used to facilitate deploying multiple modules with the cords 10 oriented vertically into open tanks. Gas sparging by way of bubbles produced below or near the bottom of the modules can be provided at a low rate to renew the liquid around the cords 10. Gas sparging at a higher rate may be used to help control biofilm thickness either by the direct action of bubbles, bubble wakes or bubble pressure effects on the biofilm, or by causing cords 10 mounted with slack between the headers to sway in the water to produce turbulence or contact between cords 10. Optionally, gas exhausted from the cords may be recycled for use in gas sparging.

Figure 10:
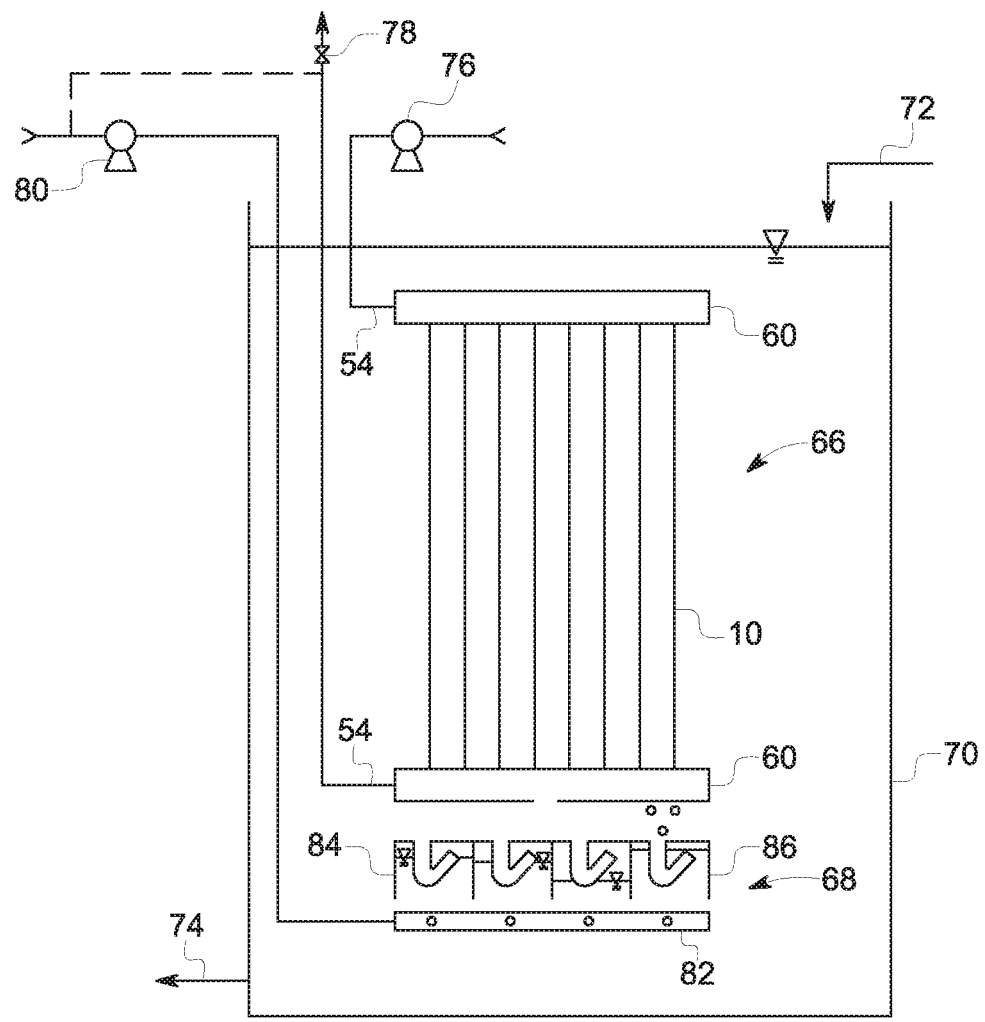
FIG. 10 is a schematic drawing of a reactor comprising the module of FIG. 9.

Referring to FIG. 10, a module 66 is immersed in a tank 70. The tank 70 is filled with water to be treated from an inlet 72. Treated water is removed through an outlet 74. Optionally, water may recirculate from the outlet 74 to the inlet 72 to provide a flow of water through the module 66, mix the tank 70, or to maintain desired conditions in the tank 70. Air, or another gas, is blown into, or drawn out of, the module 66 by a process gas blower 76. In the example shown, the gas is blown into one header 60, travels through the cords 10, and exhausted from the other header 60. A throttle valve 78 may be used to increase the gas pressure in the cords 10. A sparging gas blower 80 blows air or recycled exhaust gas from the module 66, or both, to the aerator 68 when required for mixing the tank 70 or controlling the thickness of the biofilm on the cords 10.

Optionally, the aerator 68 may comprise a supply pipe 82 and a transducer 84. The transducer 84 collects gas ejected from the supply pipe in a pocket below a shell 86. The pocket of gas grows larger as gas is accumulated as shown in the first two compartments of the shell 86, counting from the left side of the shell 86. When the pocket of gas extends to the bottom of J shaped tube, as in the third compartment of the shell 86, the gas is released through the J shaped tube as shown in the last compartment of the shell 86. In this way, large bursts of bubbles are released periodically without requiring a large volume of gas to be continuously pumped into the tank 70. Excessive scouring gas consumes energy and may disturb desirable anoxic or anaerobic conditions in the tank 70. Periodic large bursts of bubbles can be more effective for renewing the water around the cords 10 or removing biofilm from the cords 10 than the same amount of gas supplied as a continuous stream of bubbles.

In some prior MBfRs, silicon rubber or polydimethylsiloxane (PDMS) are coated over a flat substrate to make a flat sheet membrane. While silicon and PDMS are highly permeable to oxygen, such a flat sheet membrane can provide a surface area for oxygen transfer to surface area of biofilm ratio of only about 1. Further, with reasonably large sheets it is difficult to renew water to be treated along the edges of the sheet or remove excess biofilm from the edges of the sheet. Accordingly, the sheets are often separation by a substantial spacing and the total biofilm area in a tank may be low.

In U.S. Pat. No. 7,169,295 a membrane supported biofilm reactor has modules made with fine hollow fiber membranes. The fine hollow fibers have a thin wall which allows for good gas transfer efficiency even when heat spun polymers are used. However, the fine hollow fibers are also easily damaged. A tow module described in U.S. Pat. No. 7,169,295, although useful in some applications, has loose and exposed hollow fibers which are prone to damage and to being clumped together by biofilm in other applications. Sheet modules described in U.S. Pat. No. 7,169,295 are more resilient and can provide a surface area for oxygen transfer to surface area of biofilm ratio of more than 1. However, like silicon flat sheet module, these sheet modules are still subject to total biofilm area limitations.

The cords 10 described above provide a useful alternative gas transfer module configuration. The use of fine hollow fiber gas transfer membranes 14 allows for good gas transfer efficiencies even when using melt spun polymers and a surface area for oxygen transfer to surface area of biofilm ratio of more than 1. The fine hollow fiber membranes are not loose and exposed. Yet since the cords 10 can move generally independently and do not form a solid sheet, fresh liquid and bubbles used to scour the biofilm to control its thickness can reach cords 10 located in the interior of a module. Movement of the cords 10, or contact between cords 10, may also help control biofilm thickness. Further, the total biofilm surface area can be increased relative to a sheet form module.

In a calculated example, a cord 10 comprises a core 12 and two wraps 18, one in each direction, of gas transfer membrane yarns 15. The outside diameter of the cord is 1 mm. The wrapping pitch is 5 core diameters resulting in a wrap 18 helix length of 1.18 times the cord length. The cord 10 has 57 meters of 70 micron outside diameter PMP gas transfer membrane 14 per meter of cord 10 length. The surface area of the gas transfer membranes per unit length of cord is 3.04 times the outer surface area of the cord, calculated based on the circumference of a 1 mm circle.

A biofilm on the cord 10 is assumed to have a thickness of 0.2 mm giving a membrane biofilm assembly diameter of 1.4. The cords 10 are potted in a module in a rectilinear grid with a 0.7 mm gap between their outside surfaces. With biofilm attached, the gap between adjacent cords in a line is 0.4 mm. Using ZeeWeed module moldings, a module 66 has 16 rows of 340 cords 10 each, or 5440 cords 10. The exposed length of each cord is 1.9 m giving a biofilm area per module of 45.5 square meters. Using a ZeeWeed frame, a cassette with a 3.7 square meter footprint and 2.5 meter height has 64 modules 66 and a total biofilm surface area of 2910 square meters. The biofilm surface area is 315 square meters per cubic meter of cassette volume and 786 square meters per square meter of cassette footprint.

In comparison, a comparable sheet form module made with similar gas transfer membranes 14 can have a 1 mm thick fabric with a similar gas transfer surface area to biofilm surface area of 3.34. The sheets are made into a module with horizontally apposed vertical headers. The module is 2 m long with 1.8 m of exposed membrane length. The sheets and module are 1 m high. The module is 0.3 m wide and can be operated in a 1.5 m deep tank. The centre-to-centre spacing between adjacent sheets is 8 mm. The biofilm surface area is 250 square meters per cubic meter of cassette volume and 250 square meters per square meter of cassette footprint.

As illustrated by the comparison above, the cord 10 module can have more biofilm area per unit volume of module than a sheet form module. Further, tall sheet modules that rely on bubbles for liquid renewal or scouring have been known in the context of filtering membranes to be prone to a chimney effect whereby bubbles and liquid flow are concentrate near the vertical midline of the sheets. This limits the height of sheet modules. It is expected that a cord 10 module can be higher without a similar chimney effect which allows for an additional decrease in tank footprint and land consumption per unit biofilm area.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art.

We claim:
1. A process comprising the steps of,
immersing a gas transfer membrane in water;
flowing a gas into the gas transfer membrane;
supporting a biofilm on the gas transfer membrane;
transferring oxygen to the biofilm;
withdrawing an exhaust gas from the gas transfer membrane; and,
producing bubbles comprising the exhaust gas in the water,
wherein the exhaust gas is transferred from the gas transfer membrane to an aerator and wherein the bubbles comprising the exhaust gas are produced by the aerator and wherein the bubbles help control a thickness of the biofilm.

2. The process of claim 1 wherein the exhaust gas is pumped from the gas transfer membrane to the aerator.

3. The process of claim 1 wherein exhaust gas from a plurality of gas transfer membranes is collected in a header before being transferred from-to the aerator.

4. The process of claim 1 wherein the bubbles are produced periodically.

5. The process of claim 1 wherein the aerator comprises a transducer.

* * * * *